(12) United States Patent
Desjardins

(10) Patent No.: US 6,840,661 B2
(45) Date of Patent: Jan. 11, 2005

(54) FLUSH FITTING LED TURN SIGNAL

(76) Inventor: Gregg P. Desjardins, 1334 Peggy Ct., Campbell, CA (US) 95008

( * ) Notice: Subject to any disclaimer, the term of this patent is extended or adjusted under 35 U.S.C. 154(b) by 94 days.

(21) Appl. No.: 10/422,970

(22) Filed: Apr. 25, 2003

(65) Prior Publication Data

US 2004/0213013 A1 Oct. 28, 2004

(51) Int. Cl.⁷ .................................................. B60Q 1/38
(52) U.S. Cl. ...................... 362/545; 362/473; 362/546; 362/540; 362/498
(58) Field of Search ................................. 362/545, 540, 362/498, 473, 544, 475, 476, 474, 800, 249, 240, 543, 546, 548, 509, 332, 468, 202

(56) References Cited

U.S. PATENT DOCUMENTS

| 3,950,727 A | 4/1976 | Fletcher et al. ............... 714/31 |
| 4,361,829 A | 11/1982 | Kramholler et al. ........ 340/475 |
| 4,858,081 A | 8/1989 | James ........................ 362/464 |
| 4,949,228 A | 8/1990 | Lin et al. .................... 362/473 |
| 5,247,431 A | 9/1993 | Liu ............................ 362/474 |
| 5,418,696 A | 5/1995 | Izzo, Sr. ..................... 362/473 |
| 5,617,303 A | 4/1997 | Izzo, Sr. ..................... 362/473 |
| 5,689,232 A | 11/1997 | O'Shaughnessy et al. .. 340/468 |
| 5,797,672 A | 8/1998 | Dobert ....................... 362/190 |
| 6,053,626 A * | 4/2000 | Zagrodnik et al. .......... 362/473 |
| 6,081,190 A | 6/2000 | Kellermann ................ 340/465 |
| 6,461,017 B2 * | 10/2002 | Selkee ........................ 362/249 |
| 6,464,379 B1 | 10/2002 | Mc Kenna .................. 362/473 |
| 2002/0097586 A1 | 7/2002 | Horowitz .................... 362/545 |
| 2002/0118548 A1 | 8/2002 | Kuenstler et al. ........... 362/518 |

* cited by examiner

Primary Examiner—Thomas M. Sember
Assistant Examiner—Bao Q Truong
(74) Attorney, Agent, or Firm—Richard C. Litman

(57) ABSTRACT

The flush fitting front LED turn signal is adapted to provide a streamlined and nearly seamless transition to a motorcycle fairing. The present invention replaces bulky eternal front mounted motorcycle turn signals and utilizes the existing openings in the front fairing of the motorcycle. The present invention has an aluminum housing, and a LED assembly with a translucent dome extending outward from a bore within the housing.

18 Claims, 6 Drawing Sheets

FLUSH FITTING LED TURN SIGNAL

BACKGROUND OF THE INVENTION

1. Field of the Invention

The present invention relates generally to light bulb assemblies for vehicles. More specifically, the invention is a flush fitting turn signal for motorcycles using light emitting diode (LED) lamps.

2. Description of the Related Art

Light bulb assemblies for motorcycles or sportbikes typically are an assembly having an incandescent light bulb mounted in a reflector housing with a tinted lens or light-transmissive cover.

Today's sportbikes purchased directly from the dealer are equipped with very large turn signals that protrude out from the sides of the front fairing. While functional, these lights often take away from the overall streamlined appearance of the motorcycle. Many owners remove these stock lights soon after purchasing the vehicle and have found alternative locations for more esthetically pleasing and functional front turn signals. One alternative has been handlebar-mounted lamps, utilizing either incandescent or light emitting diodes (LEDs), as described by U.S. Pat. Nos. 4,361,829, 5,247,431, and 6,081,190. Generally, the LED implemented turn signals are more effective in resisting damage due to vibration generated during normal and off-road use.

The unique structural and environmental conditions experienced by motorcycles have resulted in a variety of lighting devices specifically developed for motorcycles, which have generally require additional support structures and do not maintain the streamline appearance of the motorcycle. Examples of these lighting devices include U.S. Pat. Nos. 3,950,727, 4,949,228, 5,418,696, 5,617,303, 5,689,232, 6,461,017, and 6,464,379.

While motorcycle enthusiasts are sensitive to the issue of streamlined appearance, they are not willing to forgo practicality and safety, and therefore having a turn signal viewable from all positions is desired. Thus a flush fitting LED turn signal, which can be viewed from all positions, is desired.

None of the above inventions and patents, taken either singly or in combination, is seen to describe the instant invention as claimed.

SUMMARY OF THE INVENTION

The flush fitting front LED turn signal has a flush mounted aluminum housing and an LED assembly with a domed lens extending beyond the upper surface of the housing. The housing, attached from behind the fairing, presents an outer surface flush with the front fairing of a motorcycle. Mounted within the housing is a multi-chip high-intensity, sunlight visible LED assembly, the dome of which protrudes beyond the surface of the housing and is visible from all angles. Mounted from within the fairing without any modification to the vehicle, the present invention presents a nearly seamless transition to the vehicle's bodywork, while providing the ruggedness and longevity of LED technology. The combination of housing and LED assembly may be provided in a variety of colors to match the factory finish.

Accordingly, it is a principal object of the invention to provide a flush fitting front LED turn signal for motorcycles and sportbikes.

It is another object of the invention to provide a turn signal for a motorcycle which is more rugged than the standard external mounted incandescent lamps supplied as original equipment on motorcycles through a flush mounted turn signal utilizing an LED assembly.

It is a further object of the invention to provide flush fitting front LED turn signals for a motorcycle in order to reduce the risk of damage if the motorcycle is laid on its side.

It is another object of the invention to provide a turn signal for motorcycles, which is visible from all viewing perspectives for safety purposes, and which is also mounted flush within the motorcycle fairing for producing an aesthetically pleasing, streamlined appearance.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
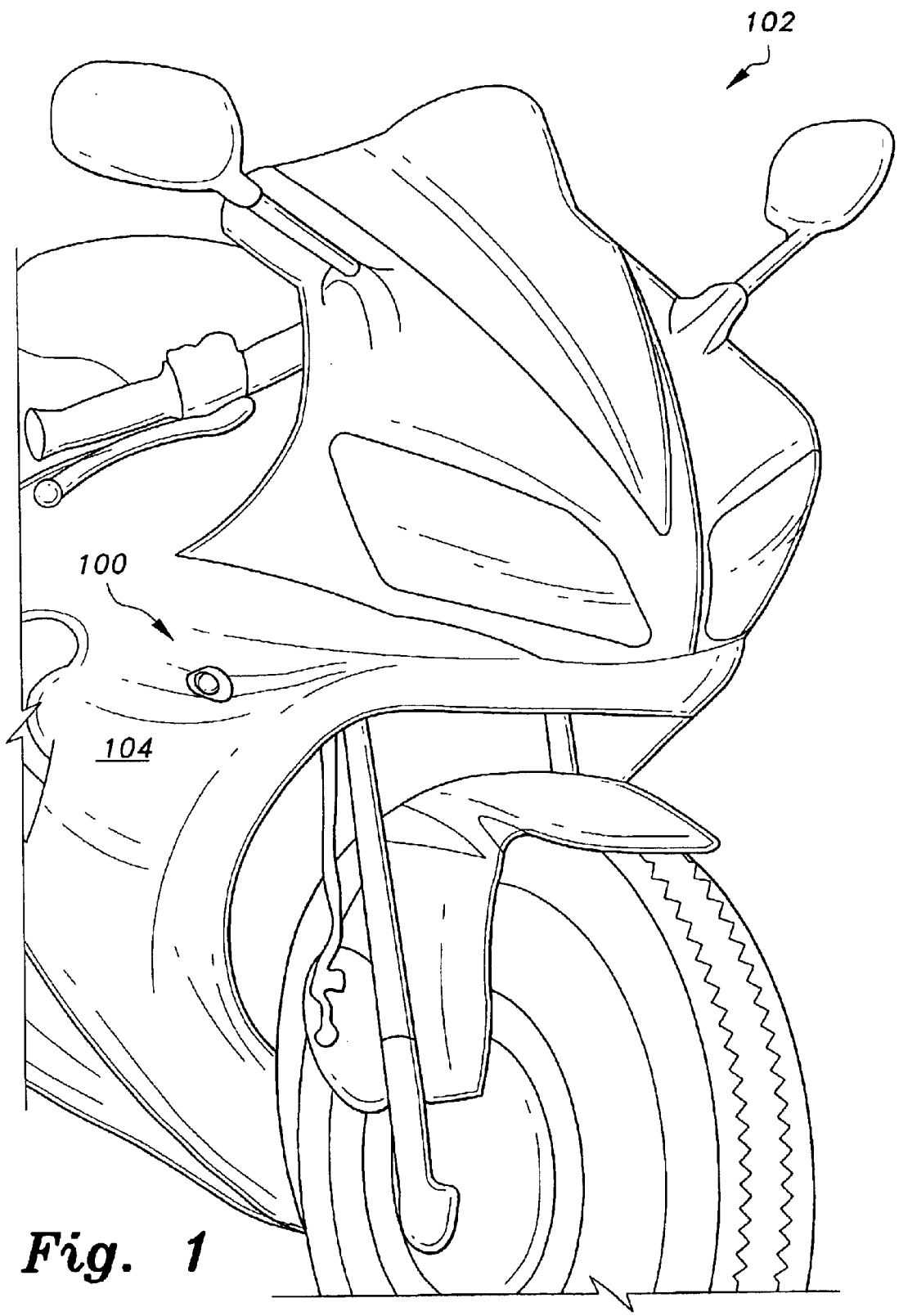
FIG. 1 is an environmental, perspective view of a motorcycle with a flush fitting front LED turn signal according to the present invention.
Figure 2:
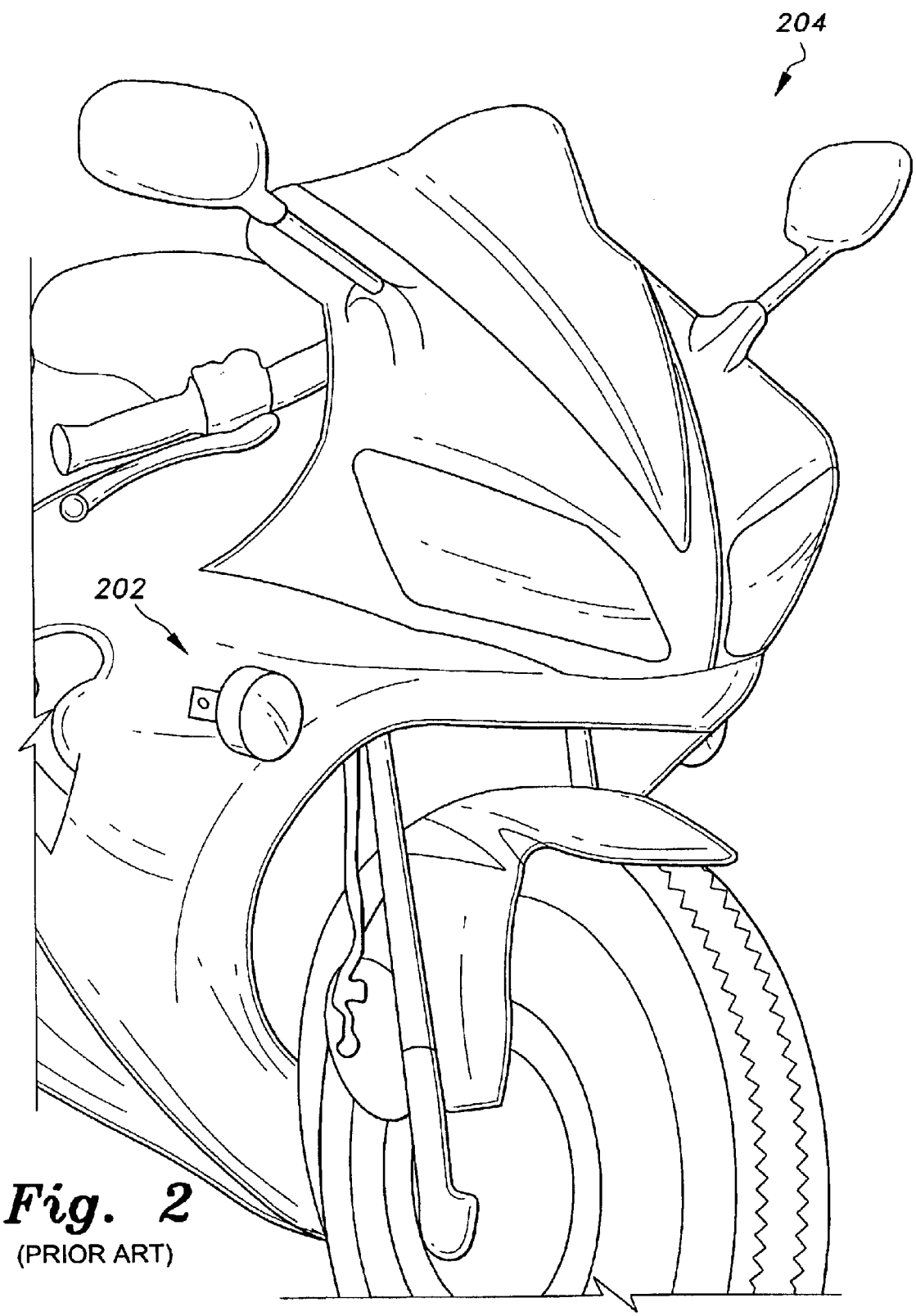
FIG. 2 is an environmental, perspective view of a protruding front turn signal according to the prior art.

As shown in FIG. 1, the present invention is a flush fitting front turn signal 100 mounted within the front fairing 104 of a motorcycle 102 that replaces the original equipment, large protruding stock turn signals 202 that extend from the sides of a motorcycle 204 as shown in the prior art of FIG. 2. The flush fitting front turn signal 100 of the present invention presents a nearly seamless transition to a motorcycle fairing 104.

Figure 3:
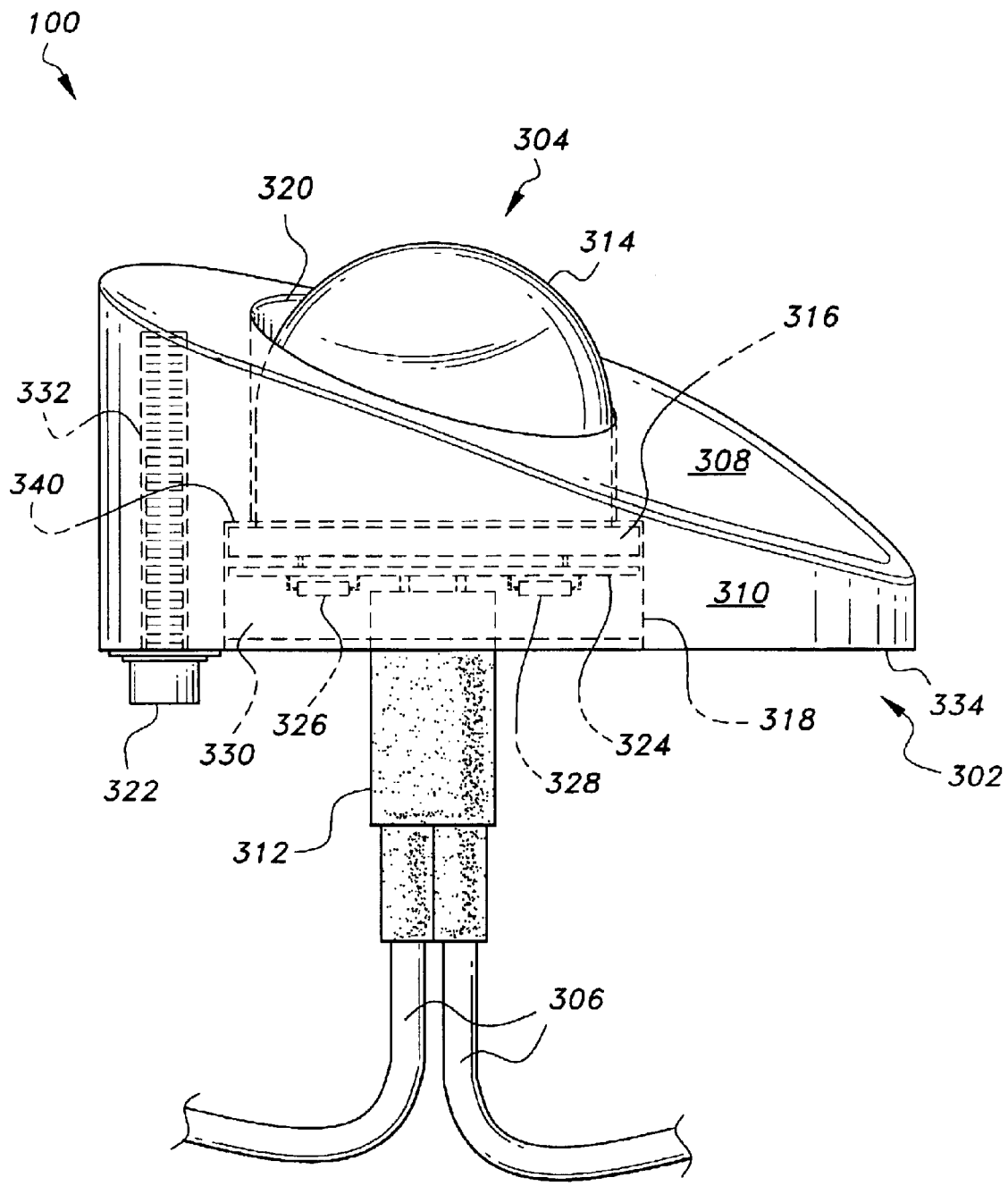
FIG. 3 is a side view of a flush fitting LED turn signal according to the present invention.
Figure 4:
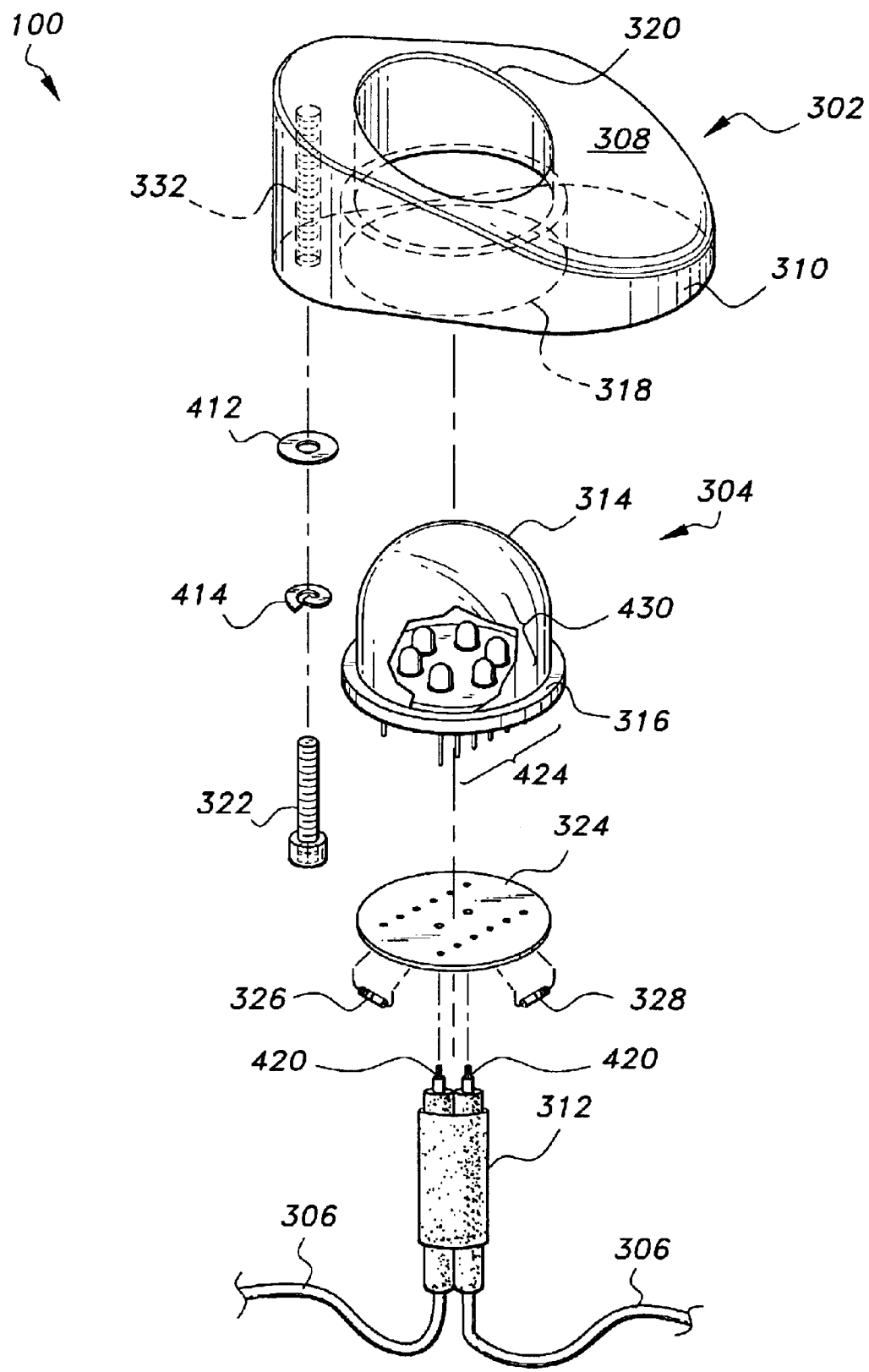
FIG. 4 is an exploded, perspective view of a flush fitting LED turn signal according to the present invention.

As shown in FIGS. 3 and 4, the flush fitting front turn signal 100 has a computer numeric controlled (CNC) machined aluminum housing 302 having a flat, planar, generally oval-shaped bottom surface 334 which is broader at one end than at the opposite end, and a preferably slightly convex top surface 308. The top surface 308 slopes downward, so that the lateral surface 310 is taller at the broad end of the housing 302 than at the narrow end of the housing 302. A first cylindrical bore 318 extends upward from the bottom surface 334 into the body of the housing 302. A second cylindrical bore 320 coaxial with and merging into the first bore 318 extends downward from the top surface 308 into the housing 302. The diameter of the first bore 318 is slightly greater than the diameter of the second bore 320, defining a lip or ledge 340 at the junction between the first bore 318 and second bore 320.

An LED assembly 304, having a translucent dome 314 mounted on a slightly larger circular base 316, is received by the first 318 and second 320 bores. When fully inserted into the housing 302, the base 316 of the LED assembly 304 abuts the ledge 340. The depth of the first bore 318 is predetermined to position the LED assembly 304 such that the translucent dome 314 extends beyond the top surface 308 of the housing 302, thereby allowing light emitted from the LED assembly 304 to be visible from all directions.

Figure 5:
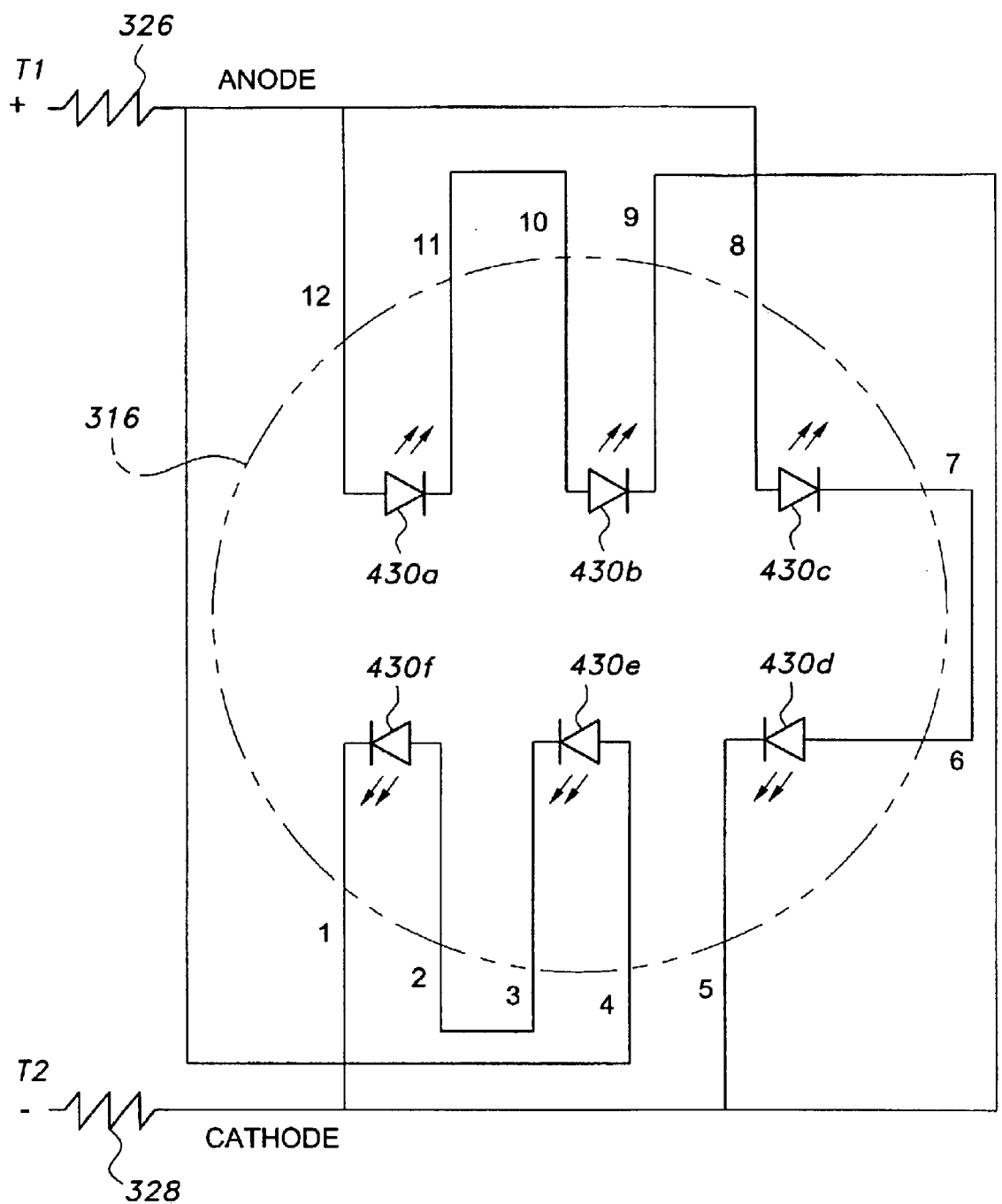
FIG. 5 is a representative schematic of the electronic components of a flush fitting LED turn signal according to the present invention.

As shown in FIG. 3 and further detailed in the exploded view of FIG. 4, a circular printed circuit board 324 is adapted to engage the leads or pins of six LEDs 430 of the LED assembly 304. The leads of the LEDs 430 are soldered to the printed circuit board 324 or other mechanical support. The LEDs 430 are divided into three pairs of series connected LEDs, which are then wired in parallel. A first 33 ohm, 1 watt current limiting resistor 328 is connected to the cathode end of the three parallel connected LED pairs, and a second 33 ohm, 1 watt current limiting resistor 326 is connected to the anode end of the three pairs. The schematic drawing shown in FIG. 5 illustrates the electrical connectivity between the LEDs, including first pair 430a, 430b, second pair 430c, 430d, and third pair 430e, 430f, and resistors 326, 328 provided by the printed circuit board 324.

Figure 6:
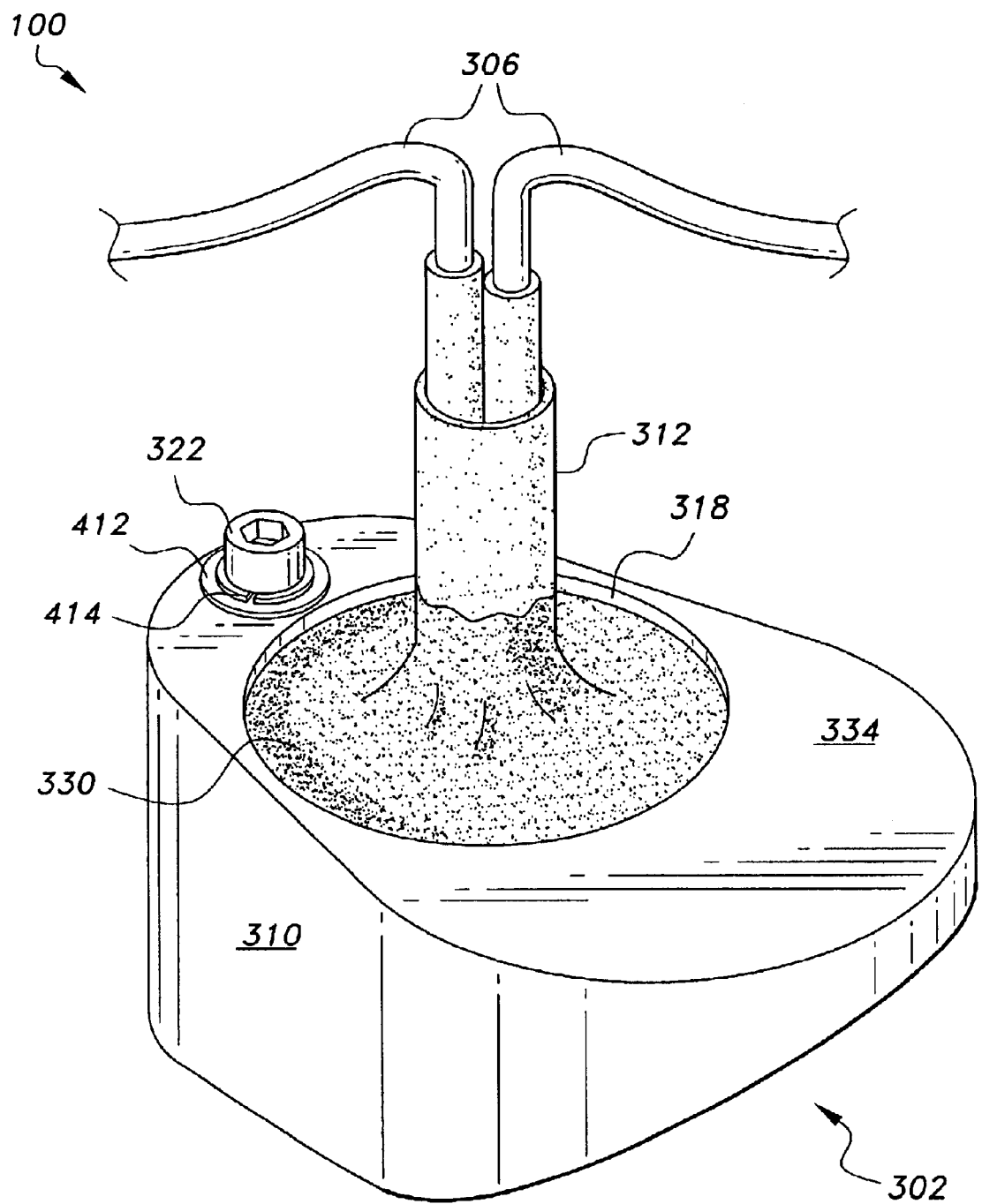
FIG. 6 is a bottom, perspective view of a flush fitting LED turn signal according to the present invention.

The stripped ends 420 of two electrically conducting wires 306, are soldered or otherwise secured to the circuit board 324, and supply a DC voltage from the motorcycle battery across terminals T1 and T2 via a turn signal relay which flashes the LEDS 430 on and off at timed intervals to produce the flashing turn signal. A shrink-wrap cover 312 secures the wires together and, as shown in FIG. 6, epoxy or another adhesive material securely retains the light assembly 304, circuit board 324, and wires 306 within the housing 302.

The housing 302 is inserted from the outside of the motorcycle fairing 104, the top surface flush with, the surface of the fairing 104 and the dome 314 protruding therefrom. On the inside of the fairing 104, a bolt 322, lock washer 414, and washer 412 are received by a threaded blind bore 332 which opens on the bottom surface 334 of the housing 302, and secures the housing 302 to the motorcycle fairing 104. The housing 302 is designed to fit within the original equipment factory turn signal mounting hole without any modification to the vehicle bodywork. The housing 302 may be painted to match the fairing, or may have a raw, polished aluminum finish.

The LEDs 430 may be discrete components, or may be furnished in a six-chip, 12 pin dual in-line package (DIP), such as an L806TY3K available from Ledtronics, Inc. of Torrance, Calif. The LEDs 430 are preferably amber LEDS. The LEDs 430 are preferably high intensity LEDs, producing sufficient intensity that the flashing turn signal is visible in sunlight. The dome 314 may be either clear or tinted amber.

It is to be understood that the present invention is not limited to the embodiment described above, but encompasses any and all embodiments within the scope of the following claims.

I claim:

1. A flush fitting front LED turn signal, comprising:
   a housing adapted for attachment to a turn signal mounting hole in a motorcycle fairing;
   an LED assembly mounted in said housing, the assembly having:
      at least one light emitting diode adapted for attachment to a motorcycle turn signal circuit; and
      a dome-shaped lens disposed over said at least one light emitting diode and extending from said housing;
   wherein said housing is contoured to fit flush with the motorcycle fairing, only a portion of said dome protruding beyond the fairing so that a flashing turn signal light emitted from said LED assembly is visible from directions lateral to the fairing.

2. The flush fitting front LED turn signal according to claim 1, wherein said housing is made from aluminum.

3. The flush fitting front LED turn signal according to claim 1, wherein said housing comprises a body having:
   a flat, planar bottom surface having a substantially oval shape with a broad end and a narrow end;
   a convex top surface; and
   a lateral surface normal to said bottom surface, the top surface sloping downward from the broad end to the narrow end.

4. The flush fitting LED turn signal according to claim 3, wherein said housing has a first cylindrical bore extending from the bottom surface into said body, and a second cylindrical bore coaxial with said first bore and extending from the top surface into said body and merging with said first bore, said first bore having a diameter greater than said second bore and defining a ledge at a junction between said first bore and said second bore.

5. The flush fitting front LED turn signal according to claim 3, wherein said LED assembly further comprises a circular mounting base, said at least one light emitting diode and said dome-shaped lens being mounted on said circular mounting base, said LED assembly being inserted into said housing with said circular mounting base abutting said ledge and said dome-shaped lens extending through said second bore and above the top surface of said housing.

6. The flush fitting front LED turn signal according to claim 1, wherein said at least one light emitting diode comprises a plurality of discrete, high-intensity LEDs.

7. The flush fitting front LED turn signal according to claim 1, wherein said at least one light emitting diode comprises a multi-chip LED dual in-line package of light emitting diodes.

8. The flush fitting front LED turn signal according to claim 1, wherein said at least one light emitting diode comprises an amber LED.

9. The flush fitting front LED turn signal according to claim 1, wherein said dome-shaped lens comprises a clear, transparent lens.

10. The flush fitting front LED turn signal according to claim 1, wherein said dome-shaped lens comprises an amber tinted lens.

11. A flush fitting front LED turn signal, comprising:
   a housing adapted for attachment to a turn signal mounting hole in a motorcycle fairing;
   an LED assembly mounted in said housing, the assembly having:
      a plurality of light emitting diodes mounted in a dual in-line package adapted for attachment to a motorcycle turn signal circuit; and
      a dome-shaped lens disposed over said dual in-line package and extending from said housing;
   wherein said housing is contoured to fit flush with the motorcycle fairing, only a portion of said dome protruding beyond the fairing so that a flashing turn signal light emitted from said LED assembly is visible from directions lateral to the fairing.

12. The flush fitting front LED turn signal according to claim 11, wherein said housing is made from aluminum.

13. The flush fitting front LED turn signal according to claim 11, wherein said housing comprises a body having:
- a flat, planar bottom surface having a substantially oval shape with a broad end and a narrow end;
- a convex top surface; and
- a lateral surface normal to said bottom surface, the top surface sloping downward from the broad end to the narrow end.

14. The flush fitting front LED turn signal according to claim 13, wherein said housing has a first cylindrical bore extending from the bottom surface into said body, and a second cylindrical bore coaxial with said first bore and extending from the top surface into said body and merging with said first bore, said first bore having a diameter greater than said second bore and defining a ledge at a junction between said first bore and said second bore.

15. The flush fitting front LED turn signal according to claim 3, wherein said LED assembly further comprises a circular mounting base, said dual in-line package and said dome-shaped lens being mounted on said circular mounting base, said LED assembly being inserted into said housing with said circular mounting base abutting said ledge and said dome-shaped lens extending through said second bore and above the top surface of said housing.

16. The flush fitting front LED turn signal according to claim 11, wherein plurality of light emitting diodes comprises amber LEDs.

17. The flush fitting front LED turn signal according to claim 11, wherein said dome-shaped lens comprises a clear, transparent lens.

18. The flush fitting front LED turn signal according to claim 11, wherein said dome-shaped lens comprises an amber tinted lens.

* * * * *